(12) United States Patent
Xie et al.

(10) Patent No.: US 11,802,055 B1
(45) Date of Patent: Oct. 31, 2023

(54) METHOD FOR PREPARING LITHIUM NICKLE COBALT MANGANESE OXIDE BY REVERSE POSITIONING OF POWER BATTERY AND USE THEREOF

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

(72) Inventors: Yinghao Xie, Guangdong (CN); Haijun Yu, Guangdong (CN); Changdong Li, Guangdong (CN)

(73) Assignees: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

( * ) Notice: Subject to any disclaimer, the term of this patent is extended or adjusted under 35 U.S.C. 154(b) by 0 days.

(21) Appl. No.: 18/029,651

(22) PCT Filed: Apr. 30, 2021

(86) PCT No.: PCT/CN2021/091663
§ 371 (c)(1),
(2) Date: Mar. 30, 2023

(87) PCT Pub. No.: WO2022/134423
PCT Pub. Date: Jun. 30, 2022

(30) Foreign Application Priority Data

Dec. 23, 2020 (CN) .......................... 202011535963.3

(51) Int. Cl.
*C01G 53/00* (2006.01)
*H01M 10/54* (2006.01)
(52) U.S. Cl.
CPC ............. *C01G 53/50* (2013.01); *C01G 53/52* (2013.01); *C01G 53/54* (2013.01); *C01G 53/56* (2013.01); *H01M 10/54* (2013.01); *C01P 2004/03* (2013.01)
(58) Field of Classification Search
CPC ........ C01G 53/50; C01G 53/52; C01G 53/54; C01G 53/56; H01M 10/54; C01P 2004/03
See application file for complete search history.

(56) References Cited

FOREIGN PATENT DOCUMENTS

| | | |
|---|---|---|
| CN | 102328961 A | 1/2012 |
| CN | 102513541 A | 6/2012 |
| CN | 103972493 A | 8/2014 |
| CN | 107195872 A | 9/2017 |
| CN | 107403903 A | 11/2017 |
| CN | 107585793 A | 1/2018 |
| CN | 108987840 A | 12/2018 |
| CN | 109921008 A | 6/2019 |
| CN | 111206151 A | 5/2020 |
| CN | 112111649 A | 12/2020 |
| CN | 112661201 B | 11/2022 |
| GB | 2 424 651 A | 10/2006 |

OTHER PUBLICATIONS

Notification to Grant Patent Right for Invention issued by the State Intellectual Property Office of People's Republic of China for Chinese Patent Application No. 202011535963.3, dated Aug. 29, 2022, with an English translation.

*Primary Examiner* — Steven J Bos
(74) *Attorney, Agent, or Firm* — Myers Wolin, LLC

(57) ABSTRACT

Disclosed are a method for preparing lithium nickle cobalt manganese oxide by reverse positioning of a power battery and use thereof. The method first mixes and grinds a positive electrode tab and a slagging agent, then dries, cools, adds an aluminum powder, mixes well, conducts a self-propagating reaction to the mixed material, cools, takes a lower layer of rough nickel cobalt manganese alloy, grinds the rough nickel cobalt manganese alloy, adds an alkali liquor, then immerses, filters, takes the filter residue for washing and then dries, to obtain a nickel cobalt manganese alloy powder, adds a lithium salt solution to the porous nickel cobalt manganese alloy powder, mixes and drips an alkali liquor, ages, filters, takes a filter residue for washing and then dries, to obtain a mixed powder of precursor, sinters the mixed powder of precursor and cools, to obtain a lithium nickle cobalt manganese oxide.

5 Claims, 1 Drawing Sheet

METHOD FOR PREPARING LITHIUM NICKLE COBALT MANGANESE OXIDE BY REVERSE POSITIONING OF POWER BATTERY AND USE THEREOF

CROSS-REFERENCE TO RELATED APPLICATIONS

This application is a National Stage under 35 U.S.C. § 371 of International Application Number PCT/CN2021/091663, filed on Apr. 30, 2021, and which designated the U.S., which claims priority to Chinese Patent Application No. 202011535963.3, filed on Dec. 23, 2020. The contents of each are incorporated herein by reference in their entirety.

TECHNICAL FIELD

The present disclosure relates to the technical field of lithium battery recycle, and more particularly, to a method for preparing lithium nickle cobalt manganese oxide by reverse positioning of power battery and use thereof.

BACKGROUND

According to the date from Ministry of Industry and Information Technology of the People's Republic of China, the production and sales of new energy vehicles was respectively 1.242 million and 1.206 million in 2019, in which the production and sales of battery electric vehicles was respectively 1.02 million and 972 thousand. Driven by the new energy vehicles industry, the power battery industry has been developed rapidly.

Extensive promotion of new energy vehicle drives extensive use of power battery, generally the life span of power battery is 5-8 years, after a certain period of use, the battery performance attenuates, which does not meet the customer's use demand, and the power battery needs to be recycled and disassembled. The traditional recycling method is disassembling the power battery, taking out the battery cell and successively conducting the processes such as pyrolysis, crushing, sorting, acid dissolution, impurity removal, extraction, reverse extraction, precipitation and the like to recycle and prepare nickel cobalt manganese hydroxide. When the positive electrode tab is treated by the traditional method, aluminum needs to be treated as a purity. The traditional method has a long process, a large assumption of raw and supplemental materials, high energy assumption, and secondary waste water is produced after treatment, and the secondary pollutant treatment has high cost and obvious limitation.

A reverse positioning refers to a process in which within the boundary of life cycle, after a product is scrapped, it is subjected to a certain treatment, such that it has a same (or better) quality in the same field. Recycling and preparing lithium nickle cobalt manganese oxide by the reverse positioning of waste power battery can shorten the treatment flow, reduce the secondary pollution, and reduce energy consumption of the treatment, thus becoming the development trend in the future.

SUMMARY

The purpose of the present disclosure is to provide a method for preparing lithium nickle cobalt manganese oxide by a reverse positioning of power battery and use thereof. The method treats and re-prepares the lithium nickle cobalt manganese oxide used in battery by the reverse positioning of a waste power battery, realizing the scrapped materials to be connected with the raw and supplemental materials in a short distance, the process flow is short, the consumption of the raw and supplemental materials is less, with a low energy consumption, low treatment cost, and less pollution emission, thus the whole process is environmental friendly.

In order to achieve the above objective, the present disclosure adopts the following technical solution:

A method for preparing lithium nickle cobalt manganese oxide, comprising the following steps:

(1) disassembling and separating the waste battery, to obtain a positive electrode tab, a negative electrode tab and a diaphragm;

(2) mixing and grinding the positive electrode tab and a slag forming agent, then drying, cooling, adding an aluminum powder and mixing well;

(3) conducting a self-propagating reaction to the mixed materials at step (2), cooling, and taking out a rough nickel cobalt manganese alloy in the lower layer;

(4) grinding the rough nickel cobalt manganese alloy, adding an alkali liquor, and immersion, filtering, taking out a filter residue for washing and then drying, to obtain a nickel cobalt manganese alloy powder;

(5) adding a lithium salt solution to the porous nickel cobalt manganese alloy powder, mixing and dripping the alkali liquor, aging, filtering, taking out a filter residue for washing and drying, to obtain a mixed powder of precursor; and (6) sintering the mixed powder of precursor and cooling, to obtain a lithium nickle cobalt manganese oxide.

A cathode material of the positive electrode tab is lithium nickle cobalt manganese oxide, wherein the molar ratio of nickel, cobalt and manganese is x:y:1-x-y, in which $0<x<1$, $y>0$, $x+y\leq1$.

Preferably, at step (2), the slagging agent includes one or more of calcium oxide, silicon dioxide or calcium fluoride, the weight ratio of the positive electrode tab and the slagging agent is (15-20):1. More preferably, the slagging agent is a combination of calcium oxide and calcium fluoride, wherein the adding quantity of calcium fluoride needs not to be too much, because the electrode tab may contain an electrolyte after disassembly of the battery, the electrolyte may decompose in air, lithium fluoride is produced after decomposition of the electrolyte, lithium fluoride reacts with calcium oxide in a high temperature to obtain calcium oxide, which makes full use of the characteristics of the waste battery.

Preferably, at step (2), the positive electrode tab is ground to a particle size of 1-20 mm.

Preferably, at step (2), the temperature of drying is 100° C.-180° C.

Preferably, at step (2), the weight ratio of a mixed material of the positive electrode tab with the ground slagging agent and an aluminum powder is (2-5):1.

Preferably, at step (3), a specific step of self-propagating reaction is putting the material into a self-propagating reactor, and in an inert atmosphere, igniting the magnesium powder to initiate the self-propagating reaction, the inert atmosphere is nitrogen, helium or argon.

Preferably, at step (4), the particle size of the rough nickel cobalt manganese alloy after grinding is 1-10 μm.

Preferably, at step (4), the solid-to-liquid ratio of the ground material of the rough nickel cobalt manganese alloy and the alkali liquor is 1:(2-5)kg/L, the concentration of the alkali liquor is 0.5-3 mol/L.

Preferably, at step (4), the immersion adopts an ultrasonic immersion, the power density of the ultrasonic wave is 0.5-5 W/cm$^2$, the time for immersion is 1-5 hours.

Preferably, at step (4), the alkali liquor is at least one of sodium hydroxide solution or potassium hydroxide solution.

Preferably, at step (5), the solid-to-liquid ratio of the porous nickel cobalt manganese alloy powder and a lithium salt solution is 1:(2-5) kg/L, the concentration of the lithium salt solution is 1-3 mol/L.

Preferably, at step (5), the step of mixing and dripping the alkali liquor is: mixing rapidly at a rotary speed of 1000-5000 r/min for 20-60 minutes, and reducing the rotary speed to 100-500 r/min, dripping an alkali liquor of 0.2-3 mol/L while stirring it.

Preferably, at step (5), the time for aging is 5-10 hours.

Preferably, at step (5), the molar ratio of hydroxyl in the alkali liquor and lithium-ion in the lithium salt solution is about 1:1, the molar ratio of lithium-ion in the lithium salt solution and combined amount of nickel, cobalt and manganese content in the porous nickel cobalt manganese alloy powder is (1.1-1.3):1.

Preferably, at step (6), the technical parameter of the sintering is: under an oxygen atmosphere, heating up to 1200-1400° C. at 1-5° C./min and keeping constant temperature for 2-10 minutes, and then naturally cooling down to 700-1000° C. for sintering for 5-30 hours.

The present disclosure also provides use of the above-mentioned method in preparation of lithium-ion battery.

The present disclosure has the advantages as follows:
1. The present disclosure is to react lithium nickle cobalt manganese oxide with a metal aluminum by the self-propagating reaction, the reverse positioning uses an aluminum foil on the positive electrode tab of the waste battery as the raw material of treatment process, the treatment idea of the traditional treatment method that uses aluminum as the impurity is changed, the characteristics of self components of the waste battery is fully used to treat, reducing the consumption of the raw material.
2. In the self-propagating reaction, an excessive metal aluminum is added properly, such that the alloy obtained is a nickel cobalt manganese alloy containing a certain amount of metal aluminum, the metal aluminum is dissolved in the alkaline washing process, to form a porous nickel cobalt manganese alloy.
3. In a step of lithium salt precipitation, the aged lithium hydroxide permeates into the nickel cobalt manganese alloy, and fully fills the gaps in the porous nickel cobalt manganese alloy. The excessive lithium hydroxide that does not enter into the alloy mixes with the alloy outside the alloy, so that the lithium source is fully and evenly distributed from inside to outside of the material in the step of sintering.
4. Using the porous precursor powder is beneficial to reserve a buffering space inside the material after sintering, relieve a material stress, and conducive for the battery material to reserve a space for expansion and contraction of the material in the process of charging and discharging cycle, so as to improve the cycle performance of the material.
5. This disclosure treats and re-prepares lithium nickle cobalt manganese oxide uses in battery by reverse positioning of a waste power battery, thus realizing a short distance connection of waste material with raw and supplemental material, it has a short process, less consumption of the raw and supplemental materials, low energy consumption, low treatment cost, less pollution emission, thus the whole process is environmental friendly.

BRIEF DESCRIPTION OF DRAWINGS

The above and/or additional aspects and advantages of the present disclosure will become obvious and easy to be understood from the description of the embodiments in conjunction with the following accompanying drawings, in which.

DETAILED DESCRIPTION

Figure 1:
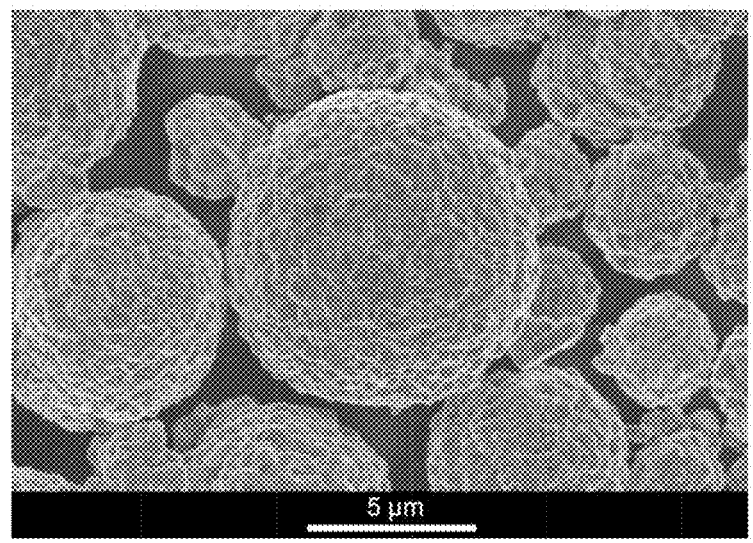
FIG. 1 is a SEM chart of the lithium nickle cobalt manganese oxide cathode material used in battery prepared by the Embodiment 1.
Figure 2:
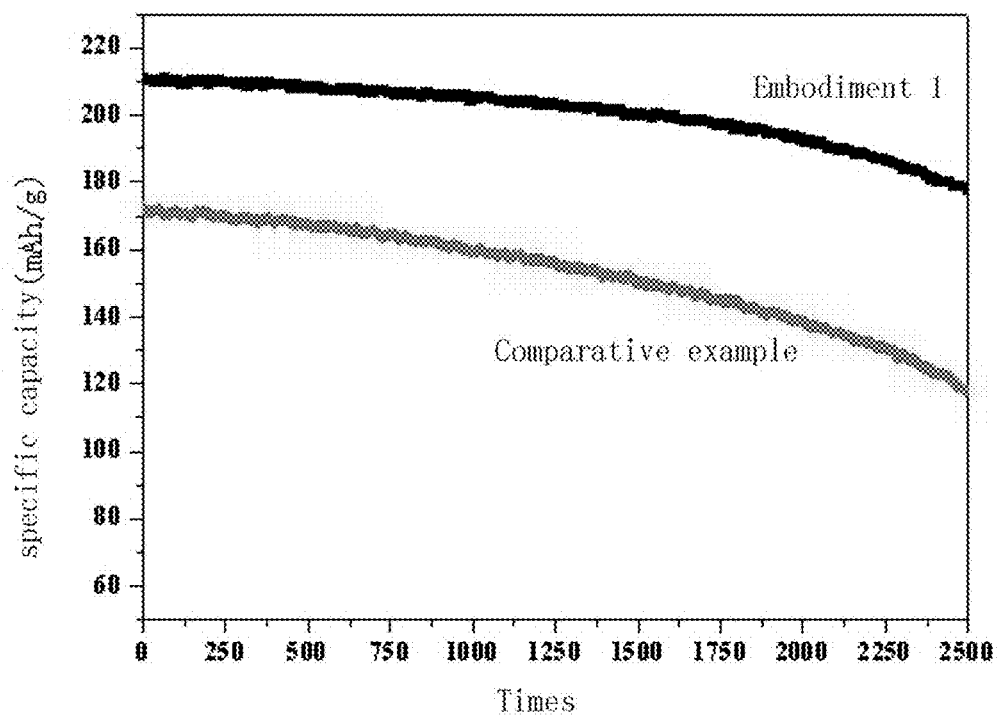
FIG. 2 is a cycle life chart of Embodiment 1 and a comparative example.

Hereinafter, in order to fully understand the present disclosure, a preferred experimental scheme of the present disclosure will be described in conjunction with the embodiments, so as to further illustrate the characteristics and advantages of the present disclosure. Any variations and changes without departing from the gist of the present disclosure will be understood by those skilled in the art, the protection scope of this present disclosure is determined by the scope of the claims.

Embodiment 1

A method for preparing lithium nickle cobalt manganese oxide by reverse positioning of a power battery, comprising the following specific steps:

(1) A waste battery is disassembled and separated to obtain battery cell, shell and lug, the battery cell is taken and dissembled, separated, to obtain a positive electrode tab in which the cathode material is lithium nickle cobalt manganese oxide, negative electrode tab, and diaphragm;

(2) A positive electrode tab and a slagging agent calcium oxide was mixed in a weight ratio of 15:1, the positive electrode tab was ground to a particle size of 1 mm, dried at 100° C., cooled to room temperature and then a metal aluminum powder was added in a ratio of 2:1, and mixed well;

(3) The mixed material at step (2) was put into a self-propagating reactor, under a nitrogen atmosphere, a magnesium powder was ignited to initiate the self-propagating reaction, cooled and then an upper layer of alumina-based smelting slag was removed, a lower layer was taken, to obtain a rough nickel cobalt manganese alloy;

(4) The rough nickel cobalt manganese alloy was ground to a particle size of 1 u m;

(5) The powder was put into a 0.5 mol/L sodium hydroxide solution in a solid-to-liquid ratio of 1:2 kg/L, immersed for 1 hour under ultrasonic vibration with a power density of 0.5 W/cm$^2$, filtered, a filter residue was taken, washed with water and then dried, to obtain a porous nickel cobalt manganese alloy powder;

(6) A 1 mol/L lithium salt solution was taken, a porous nickel cobalt manganese alloy powder was added in a solid-to-liquid ratio of 1:2 kg/L, mixed rapidly at a rotary speed of 1000 r/min and dispersed for 20 minutes, the rotary speed was reduced to 100 r/min, and a 0.2 mol/L alkali liquor was dripped while stirring, aged for 5 h, the molar ratio of hydroxyl in the dripped alkali liquor and lithium ions in the lithium salt was controlled to 1:1, meanwhile the molar ratio of lithium ion and nickel, cobalt and manganese combined amount was controlled to 1.1:1, filtered, the filter residue was taken, washed with water and then dried, to obtain a mixed powder of precursor;

(7) The mixed powder of precursor was put in an oxygen atmosphere, the temperature was raised to 1200° C. at 1° C./min and the temperature was kept constant for 2 minutes, then the temperature was naturally reduced to 700° C. and sintered for 5 hours, cooled to room temperature, to obtain a lithium nickle cobalt manganese oxide cathode material used in battery.

FIG. 1 is a SEM chart of the lithium nickle cobalt manganese oxide cathode material used in battery prepared by Embodiment 1, it can be seen from the chart, the prepared lithium nickle cobalt manganese oxide has a good sphericity and particle size distribution, the material particle is intact without obvious defect on the surface.

Embodiment 2

A method for preparing lithium nickle cobalt manganese oxide by reverse positioning of power battery, comprising the following specific steps:
(1) a waste battery was disassembled and separated, to obtain battery cell, shell, lug, and the battery cell was taken and separated, to obtain a positive electrode tab in which the cathode material was lithium nickle cobalt manganese oxide, a negative electrode tab, and a diaphragm;
(2) a positive electrode tab and a slagging agent calcium oxide were mixed at a weight ratio of 17:1, the positive electrode tab was ground to a particle size of 10 mm, dried at 150° C., cooled to room temperature and then a metal aluminum powder was added at the ratio of 3:1, mixed well;
(3) the material was put in a self-propagating reactor, under a nitrogen atmosphere, a magnesium powder was ignited to initiate a self-propagating reaction, cooled and then a upper layer of alumina-based smelting slag was removed, a lower layer was taken to obtain a rough nickel cobalt manganese alloy;
(4) the rough prepared nickel cobalt manganese alloy was ground to a particle size of 5 μm.
(5) the powder was put in a 1 mol/L sodium hydroxide solution at a solid-to-liquid ratio of 1:3 kg/L, immersed for 3 h under an ultrasonic vibration with a power density of 2 W/cm$^2$, filtered, a filter residue was taken, washed with water and then dried, to obtain a porous nickel cobalt manganese alloy powder;
(6) A 2 mol/L lithium salt solution was taken, the porous nickel cobalt manganese alloy powder was added at a solid-to-liquid ratio of 1:3 kg/L, mixed rapidly at a rotary speed of 2000 r/min and dispersed for 40 minutes, the rotary speed was reduced to 300 r/min, a 1 mol/L alkali liquor was dripped while stirring, aged for 8 h, hydroxyl in the dripped alkali liquor and lithium ion added in the lithium salt was controlled to a molar ratio of 1:1, meanwhile the molar ratio of lithium ion and nickel, cobalt and manganese combined amount was controlled to 1.2:1, filtered, a filter residue was taken, washed with water then dried, to obtain a mixed powder of precursor;
(7) the mixed powder of precursor was put in an oxygen atmosphere, the temperature was raised to 1300° C. in 3° C./min and the temperature was kept constant for 5 minutes, then naturally cooled down to 800° C. and sintered for 10 hours, cooled to room temperature, to obtain a lithium nickle cobalt manganese oxide cathode material used in battery.

Embodiment 3

A method for preparing lithium nickle cobalt manganese oxide by reverse positioning of power battery, comprising the following specific steps:
(1) a waste battery was disassembled and separated, to obtain a battery cell, a shell, a battery tab, the battery cell was taken and disassembled, separated and then obtain a positive electrode tab in which the cathode material is lithium nickle cobalt manganese oxide, a negative electrode tab, and a diaphragm;
(2) a positive electrode tab and a slagging agent calcium oxide were mixed in a weight ratio of 20:1, the positive electrode tab was ground to a particle size of 20 mm, dried at 180° C., cooled to room temperature and then a metal aluminum powder was added in a weight ratio of 5:1, mixed well;
(3) the material was put in a self-propagating reactor, under a nitrogen atmosphere, magnesium powder is ignited to initiate a self-propagating reaction, cooled and then an upper layer of alumina-based smelting slag was removed, a lower layer was taken, to obtain a rough nickel cobalt manganese alloy;
(4) the rough nickel cobalt manganese alloy was ground to a particle size of 10 μm;
(5) the powder was put into a 3 mol/L sodium hydroxide solution in a solid-to-liquid ratio of 1:5 kg/L, immersed for 5 hours under a ultrasonic vibration with a power density of 5 W/cm$^2$, filtered, the filter residue was taken, washed with water and then dried, to obtain a porous nickel cobalt manganese alloy powder;
(6) a 3 mol/L lithium salt solution was taken, the porous nickel cobalt manganese alloy powder was added in a solid-to-liquid ratio of 1:5 kg/L, mixed rapidly at a rotary speed of 5000 r/min and dispersed for 60 minutes, the rotary speed was reduced to 500 r/min, an 3 mol/L alkali liquor was dripped while stirring, aged for 10 hours, the molar ratio of hydroxyl in the dripped alkali liquor and lithium ion added into the lithium salt was controlled to 1:1, meanwhile the molar ratio of lithium ion and nickel, cobalt and manganese combined amount was controlled to 1.3:1, filtered, a filter residue was taken, washed with water and then dried, to obtain a mixed powder of precursor;
(7) the mixed powder of precursor was put under an oxygen atmosphere, heated to 1400° C. at 5° C./min and the temperature was kept constant for 10 minutes, then naturally cooled down to 1000° C. and sintered for 30 hours, cooled to room temperature, to obtain a lithium nickle cobalt manganese oxide cathode material used in battery.

Comparative Example

A waste battery were taken and subjected to disassembly, pyrolysis, crushing, sorting, to obtain an electrode material powder, the electrode material powder was dissolved in hydrochloric acid, an alkali liquor was added and adjusting pH to 9-10, filtered, a filtering liquid was taken, an alkali liquor was added and adjusting pH>13, filtered, a filter residue was taken, lithium hydroxide was added and mixed in a molar ratio of metal content of 1:1, the temperature was kept constant at 850° C. for 20 hours, to obtain lithium nickle cobalt manganese oxide.

Performance Test:

Using the lithium nickle cobalt manganese oxide prepared by above Embodiment 1 and Comparative example as a positive electrode, and using graphite as a negative electrode respectively, a battery was assembled, an initial discharge test and 2500 times of charge-discharge cycle tests were conducted at 1 C rate, the results are as shown in Table 1.

TABLE 1

|  | Specific capacity (mAh/g) | Capacity retention ratio |
|---|---|---|
| Embodiment 1 | 210.8 | 84.3% |
| Comparative example | 172.3 | 68.3% |

It can be seen from Table 1, the specific capacity and the cycle performance in initial discharge of the lithium nickle cobalt manganese oxide cathode material recycled by the present disclosure are both higher than those of the traditional wet method, which is due to that the porous precursor powder adopted in the present method is beneficial to reserve a buffer space inside the material after sintering, to relieve the material stress, and conducive for battery material to give a space for expansion and contraction of the material in the process of charge-discharge cycle, so as to improve the cycle performance of material.

The method for preparing lithium nickle cobalt manganese oxide by reverse positioning of power battery and use thereof provided by the present disclosure is introduced in detail as above, and specific embodiments herein are employed to elaborate the principle and embodiments of the present disclosure, the above description of the embodiments is only intended to help understand the method and core idea thereof of the present disclosure, including the best mode, and also enable any skilled in the art to practice the present disclosure, including making and use of any apparatus or system, and implementing of any combined method. It should be noted that, several improvements and modifications may be made to the present disclosure by those ordinary skilled in the art, without departing from the principle of the present disclosure, these improvements and modifications also fall into the protection scope of the claims of the present disclosure. The patent protection scope of the present disclosure is defined by the claims, and other embodiments that can occur to those skilled in the art may be also included. If these other embodiments have a structural element that is not different from that expressed in the claims in written language, or if they include an equivalent structural element as that expressed in claims in written language without a substantial difference, these other embodiments shall also be included in the scope of claims.

The invention claimed is:

1. A method for preparing lithium nickle cobalt manganese oxide, comprising the following steps:
(1) disassembling a waste battery and separating it, to obtain a positive electrode tab, a negative electrode tab and a diaphragm;
(2) mixing and grinding the positive electrode tab and a slagging agent, then drying, cooling, adding an aluminum powder, mixing well, to obtain a material; wherein the slagging agent includes one or more of calcium oxide, silicon dioxide or calcium fluoride, the weight ratio of the positive electrode tab and the slagging agent is (15-20):1; and the weight ratio of a mixed material of the positive electrode tab with the slagging agent to the aluminum powder is (2-5):1;
(3) conducting a self-propagating reaction to the material, cooling, and taking a lower layer of rough nickel cobalt manganese alloy; wherein the step of self-propagating reaction is putting the material into a self-propagating reactor, under an inert atmosphere, igniting a magnesium powder to initiate a self-propagating reaction;
(4) grinding the rough nickel cobalt manganese alloy, adding an alkali liquor, and then immersing, filtering, taking a filter residue for washing and drying, to obtain a porous nickel cobalt manganese alloy powder;
(5) adding a lithium salt solution to the porous nickel cobalt manganese alloy powder, mixing and dripping an alkali liquor, aging, filtering, taking a filter residue for washing and drying, to obtain a mixed powder of precursor; wherein the molar ratio of hydroxyl in the alkali liquor to lithium ion in the lithium salt solution is (1-1.3):1, the molar ratio of lithium ion in the lithium salt solution to a combined amount of nickel, cobalt and manganese in the porous nickel cobalt manganese alloy powder is (1.1-1.3):1; and
(6) sintering the mixed powder of precursor and cooling to obtain the lithium nickle cobalt manganese oxide.

2. The method of claim 1, wherein at step (4), the solid-to-liquid ratio of the ground material of the rough nickel cobalt manganese alloy to the alkali liquor is 1:(2-5) kg/L, the concentration of the alkali liquor is 0.5-3 mol/L.

3. The method of claim 1, wherein at step (5), the solid-to-liquid ratio of the porous nickel cobalt manganese alloy powder to the lithium salt solution is 1:(2-5)kg/L, the concentration of the lithium salt solution is 1-3 mol/L.

4. The method of claim 1, wherein at step (5), the step of mixing and dripping the alkali liquor is: mixing rapidly at a rotary speed of 1000-5000 r/min and dispersing for 20-60 minutes, reducing the rotary speed to 100-500 r/min, dripping a 0.2-3 mol/L alkali liquor while stirring.

5. The method of claim 1, wherein at step (6), the technical parameters of the sintering are: under an oxygen and air atmosphere, heating to 1200-1400° C. at 1-5° C./min and keeping the temperature constant for 2-10 minutes, then cooling down to 700-1000° C. to sintering for 5-30 hours.

* * * * *